US006405305B1

(12) United States Patent
Meier et al.

(10) Patent No.: US 6,405,305 B1
(45) Date of Patent: Jun. 11, 2002

(54) RAPID EXECUTION OF FLOATING POINT LOAD CONTROL WORD INSTRUCTIONS

(75) Inventors: Stephan G. Meier, Mountain View; Jeffrey E. Trull, San Jose, both of CA (US); Derrick R. Meyer, Austin, TX (US); Norbert Juffa, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/394,024

(22) Filed: Sep. 10, 1999

(51) Int. Cl.[7] .................. G06F 9/302; G06F 9/312; G06F 9/34; G06F 9/445
(52) U.S. Cl. ............ 712/222; 712/226; 712/221; 712/224; 712/245; 712/217; 712/227; 708/510
(58) Field of Search ................. 712/202, 201, 712/221, 216, 148, 222, 224, 219, 244, 227, 217, 215, 223, 213, 245, 207, 205, 206, 23, 24, 228; 703/26; 709/108; 708/525, 495, 510, 497

(56) References Cited

U.S. PATENT DOCUMENTS 5,884,062 A * 3/1999 Wichman et al. ........... 712/218
6,185,672 B1 * 2/2001 Trull ........................... 712/217
6,247,117 B1 * 6/2001 Juffa ........................... 712/222

OTHER PUBLICATIONS

*Intel Architecture Software Developer's Manual*, vol. 2: Instruction Set Reference, 1997, Chapter 3, pp. 105–114 and pp. 178–182.

\* cited by examiner

*Primary Examiner*—Daniel H. Pan
(74) *Attorney, Agent, or Firm*—Conley, Rose & Tayon, PC; B. Noël Kivlin

(57) ABSTRACT

A microprocessor with a floating point unit configured to rapidly execute floating point load control word (FLDCW) type instructions in an out of program order context is disclosed. The floating point unit is configured to schedule instructions older than the FLDCW-type instruction before the FLDCW-type instruction is scheduled. The FLDCW-type instruction acts as a barrier to prevent instructions occurring after the FLDCW-type instruction in program order from executing before the FLDCW-type instruction. Indicator bits may be used to simplify instruction scheduling, and copies of the floating point control word may be stored for instruction that have long execution cycles. A method and computer configured to rapidly execute FLDCW-type instructions in an out of program order context are also disclosed.

20 Claims, 6 Drawing Sheets

RAPID EXECUTION OF FLOATING POINT LOAD CONTROL WORD INSTRUCTIONS

BACKGROUND OF THE INVENTION

1. Field of the Invention

This invention relates generally to the field of microprocessors and, more particularly, to floating point units.

2. Description of the Related Art

Most microprocessors must support multiple data types. For example, x86-compatible microprocessors must execute two types of instructions: one set defined to operate on integer data types, and a second set defined to operate on floating point data types. In contrast with integers, floating point numbers have fractional components and are typically represented in exponent-significand format. For example, the values $2.15 \times 10^3$ and $-10.5$ are floating point numbers while the numbers $-1$, $0$, and $7$ are integers. The term "floating point" is derived from the fact that there is no fixed number of digits before or after the decimal point, i.e., the decimal point can float. Using the same number of bits, the floating point format can represent numbers within a much larger range than integer format. For example, a 32-bit signed integer can represent the integers between $-2^{31}$ and $2^{31}-1$ (using two's complement format). In contrast, a 32-bit ("single precision") floating point number as defined by the Institute of Electrical and Electronic Engineers (IEEE) Standard 754 has a range (in normalized format) from $2^{-126}$ to $2^{127} \times (2-2^{-23})$ in both positive and negative numbers.

FIG. 1 illustrates an exemplary format for an 8-bit integer 100. As the figure illustrates, negative integers are represented using the two's complement format 106. To negate an integer, all bits are inverted to obtain the one's complement format 102. A constant 104 of one is then added to the least significant bit (LSB).

FIG. 2 shows an exemplary format for a floating point value. Value 110 a 32-bit (single precision) floating point number. Value 110 is represented by a significand 112 (23 bits), a biased exponent 114 (8 bits), and a sign bit 116. The base for the floating point number (2 in this case) is raised to the power of the exponent and multiplied by the significand to arrive at the number represented. In microprocessors, base 2 is most common. The significand comprises a number of bits used to represent the most significant digits of the number. Typically, the significand comprises one bit to the left of the radix point and the remaining bits to the right of the radix point. A number in this form is said to be "normalized". In order to save space, in some formats the bit to the left of the radix point, known as the integer bit, is not explicitly stored. Instead, it is implied in the format of the number.

Floating point values may also be represented in 64-bit (double precision) or 80-bit (extended precision) format. As with the single precision format, a double precision format value is represented by a significand (52 bits), a biased exponent (11 bits), and a sign bit. An extended precision format value is represented by a significand (64 bits), a biased exponent (15 bits), and a sign bit. However, unlike the other formats, the significand in extended precision includes an explicit integer bit. Additional information regarding floating point number formats may be obtained in IEEE Standard 754.

The recent increased demand for graphics-intensive applications (e.g., 3D games and virtual reality programs) has placed greater emphasis on a microprocessor's floating point performance. Given the vast amount of software available for x86 microprocessors, there is particularly high demand for x86-compatible microprocessors having high performance floating point units. Thus, microprocessor designers are continually seeking new ways to improve the floating point performance of x86-compatible microprocessors.

One technique used by microprocessor designers to improve the performance of all floating point instructions is pipelining. In a pipelined microprocessor, the microprocessor begins executing a second instruction before the first has been completed. Thus, several instructions are in the pipeline simultaneously, each at a different processing stage. The pipeline is divided into a number of pipeline stages, and each stage can execute its operation concurrently with the other stages. When a stage completes an operation, it passes the result to the next stage in the pipeline and fetches the next operation from the preceding stage. The final results of each instruction emerge at the end of the pipeline in rapid succession.

Typical pipeline stages in a modern microprocessor include fetching, decoding, address generation, scheduling, execution, and retiring. Fetching entails loading the instruction from the instruction cache. Decoding involves examining the fetched instruction to determine how large it is, whether or not it requires an access to memory to read data for execution, etc. Address generation involves calculating memory addresses for instructions that access memory. Scheduling involves the task of determining which instructions are available to be executed and then conveying those instructions and their associated data to the appropriate execution units. The execution stage actually executes the instructions based on information provided by the earlier stages. After the instruction is executed, the results produced are written back either to an internal register or the system memory during the retire stage.

Yet another technique used to improve performance is out-of-order execution. Out-of-order execution involves reordering the instructions being executed (to the extent allowed by dependencies) so as to keep as many of the microprocessor's floating point execution units as busy as possible. As used herein, a microprocessor may have a number of execution units or pipelines (also called functional units/pipelines), each optimized to perform a particular task or set of tasks. For example, one execution unit may be optimized to perform integer addition, while another execution unit may be configured to perform floating point addition.

Another popular technique used to improve floating point performance is parallel execution. Parallel execution allows more than one instruction to be executed per clock cycle. This is accomplished by having multiple execution pipelines. For example, an addition instruction may be executed in an addition execution pipeline at the same time that a multiply instruction is executed in a multiply execution pipeline. Microprocessors and floating point units that support parallel execution and pipelining are often referred to as "superscalar" because they are able to execute more than one instruction per clock cycle.

One potential source of performance problems for superscalar floating point units that execute instructions out of order is the x86 instruction FLDCW (load floating point control word). FLDCW instructions load new settings into the floating point unit's control word. These settings are then used to determine how instructions following the FLDCW instruction are executed (e.g., which rounding mode to use and what precision the results will be in).

FIG. 3 shows a diagram of an x86 compatible floating point control word (FPCW) 344. Control bits 120–130 dictate whether certain exceptions are masked or not. When a particular type of exception is masked, the floating point unit will respond using automatic masked exception handling routines that are built into the floating point unit. These automatic handling routines typically generate the most reasonable result for each condition and are used in the majority of cases. If, however, the automatic handling routine is inadequate, the user may unmask the particular exception that is of interest and thereby cause the floating point unit to trap to a user-written exception handling routine.

For example, bit 120 is an invalid operation mask bit (IM) that controls whether invalid operation exceptions are masked. If the floating point unit detects an invalid operation (e.g., an instruction causes a floating point register stack overflow) and the IM bit is set, the exception is handled by the floating point unit, which stores a predetermined NaN (not-a-number) constant into the significand of the stack register that is overwritten as a result of the stack overflow (the register's tag is also set to indicate that an infinite value is stored therein).

Bit 122 is a denormalized operand mask bit (DM) that controls whether denormal operand exceptions are masked. Bit 124 is a divide by zero mask bit (ZM) that controls whether divide by zero exceptions are masked. Bit 126 is an overflow mask bit (OM) that controls whether overflow exceptions are masked. Bit 128 is an underflow mask bit (UM) that controls whether underflow exceptions are masked. Bit 130 is a precision mask bit (PM) that controls whether precision exceptions are masked.

The problem raised by FLDCW instructions in the context of an out-of-order floating point unit is that instructions occurring before the FLDCW in program order must execute using the previous or old values of the FPCW. Similarly, instructions executing after the FLDCW instruction must execute using the new value of the FPCW (as changed by the FLDCW). In non-pipelined in-order floating point units the FLDCW instruction does not present designers any difficulties (i.e., because the FLDCW instruction is executed before any instructions that occur after the FLDCW instruction in program order). However, in a pipelined out-of-order floating point unit, instructions occurring after the FLDCW may potentially be executed before the FLDCW and thereby incorrectly rely upon an old (incorrect) version of the FPCW.

One prior art solution to this problem has been to simply cause an abort (i.e., similar to a branch misprediction) whenever an FLDCW instruction is detected. In this situation, all speculatively generated results are discarded and the floating point unit rebuilds itself from the last known non-speculatively executed instruction. This solution seemed adequate to designers because FLDCW instructions were perceived as occurring relatively infrequently in modern code.

However, in some cases new compilers are using FLDCW instructions more frequently than previously expected. As a result, a more efficient method for dealing with FLDCW instructions in an out-of-order executing floating point unit is desired.

SUMMARY

The problems outlined above may at least in part be solved by a microprocessor having a floating point unit (FPU) configured to schedule FLDCW-type instructions "in order" while still allowing other instructions to execute "out of order". As used herein, FLDCW-type instructions include all floating point instructions that load specified values into a floating point unit's control word. Both x86 and non-x86 instructions may be included. Furthermore, as used herein the term "in order" refers to executing instructions in original program order, while "out of order" refers to executing instructions in a different order relative to their original program order.

Generally speaking, in one embodiment a floating point unit is contemplated that is configured to schedule instructions older than FLDCW-type instructions before any FLDCW-type instructions are scheduled. The FLDCW-type instructions may act as "barriers" to prevent later occurring instructions from executing before the FLDCW-type instructions. Indicator bits may be used to simplify instruction scheduling in accordance with this scheme.

In some embodiments, copies of the FPU's floating point control word may also be stored for later use by instructions that have long execution cycles. For example, if an instruction immediately preceding an FLDCW-type instruction requires eight clock cycles to execute, the FLDCW-type instruction may complete execution before the eight clock cycles have elapsed. Once completed, the eight clock cycle instruction would then incorrectly rely upon the newly updated control word. One solution is to delay the execution of the FLDCW-type instruction until the maximum possible instruction latency has elapsed. However, this may not provide the desired performance. Thus, an alternative solution is to store a copy of the old control word before the FLDCW-type instruction completes execution. This copy may provided to any execution units executing long-latency instructions that began execution before the FLDCW-type instruction was executed.

A method and computer system configured to rapidly execute FLDCW-type instructions in an "out of order" context also contemplated. In some embodiments, the method includes receiving a plurality of instructions, wherein at least one of the instructions is an FLDCW-type instruction. Instructions that are older than a first FLDCW-type instruction are selected for scheduling in an out-of-order fashion. The first FLDCW-type instruction itself is only scheduled once it is the oldest remaining instruction ready for execution. Finally, instructions occurring after the first FLDCW-type instruction in program order are scheduled (also in an out-of-order fashion) after the first FLDCW-type instruction has been scheduled.

In some embodiments, indicator bits may be associated with each instruction following an FLDCW-type instruction. Instructions with asserted indicator bits may be ignored during the scheduling process. Once the preceding FLDCW-type instruction is scheduled, the indicator bits may be cleared (until another FLDCW-type instruction is reached). The instructions with cleared indicator bits may then be considered during the scheduling determination. In some implementations, the method may include waiting one or more clock cycles before scheduling any instructions after the first FLDCW-type instruction has been scheduled. This may allow the FLDCW-type instruction to execute and update the floating point unit's speculative floating point control word (FPCW) before other instructions needing the updated FPCW are executed.

As previously noted, a temporary copy of the current FPCW may also be stored for long latency instructions. For example, square root instructions are typically performed using a number of iterations. Thus, square root instructions may require a large number of clock cycles to complete execution. If an FLDCW-type instruction closely follows a square root instruction, the square root instruction may incorrectly perform its final iterations using the newly updated FPCW if a copy of the old FPCW is not retained.

A microprocessor configured to rapidly execute FLDCW-type instructions is also contemplated. In some embodiments, the microprocessor may be configured with an instruction cache configured to receive and store a plurality of instructions. A subset of the instructions may be floating point and FLDCW-type instructions. The instruction cache may be coupled to a floating point unit configured to receive the floating point instructions from said instruction cache. The floating point unit may include a scheduler configured to receive, store, and schedule floating point instructions for execution. The scheduler may be configured to select instructions older than a pending FLDCW-type instruction for scheduling (in an out-of-order fashion). The scheduler may wait to schedule the FLDCW-type instruction until it is the oldest remaining instruction in the scheduler that is ready for execution. Once the FLDCW-type instruction is scheduled, the scheduler may then begin scheduling instructions occurring after the FLDCW-type instruction (also in an out-of-order fashion). As previously noted, the scheduler may utilize indicator bits to track which instruction may be considered for scheduling.

A computer system configured to rapidly execute FLDCW-type instructions in an out-of-order context is also contemplated. In one embodiment, the computer system may comprise a system memory, a communications device for transmitting and receiving data across a network, and one or more microprocessors coupled to the memory and the communications device. The microprocessors may advantageously be configured as described above.

BRIEF DESCRIPTION OF THE DRAWINGS

Other objects and advantages of the invention will become apparent upon reading the following detailed description and upon reference to the accompanying drawings.

Figure 1:
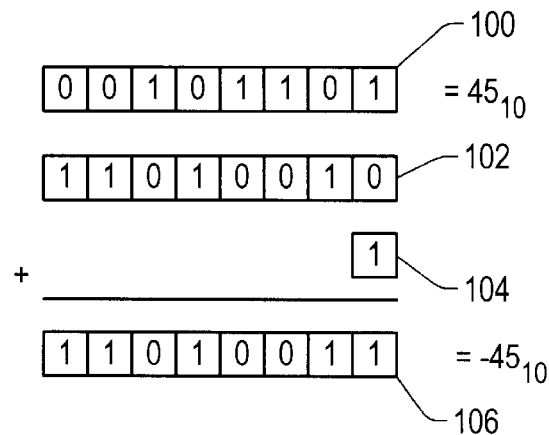
FIG. 1 illustrates an exemplary format for an integer.
Figure 2:
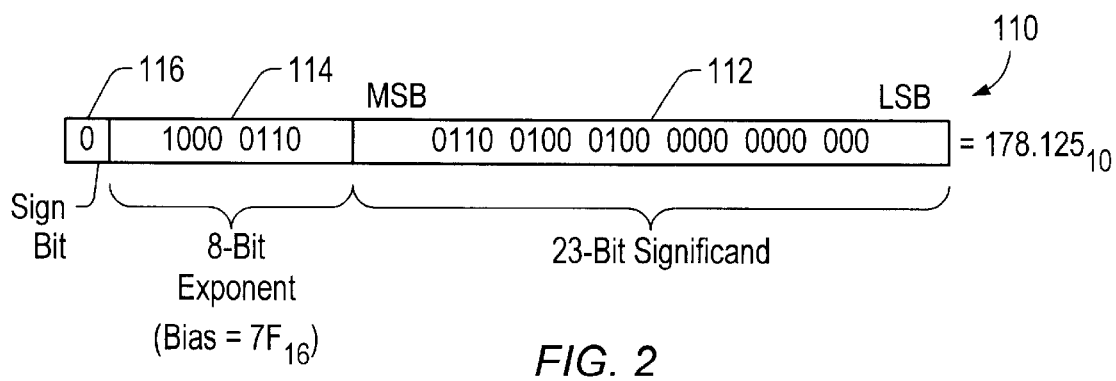
FIG. 2 shows an exemplary format for a floating point value.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Figure 4:
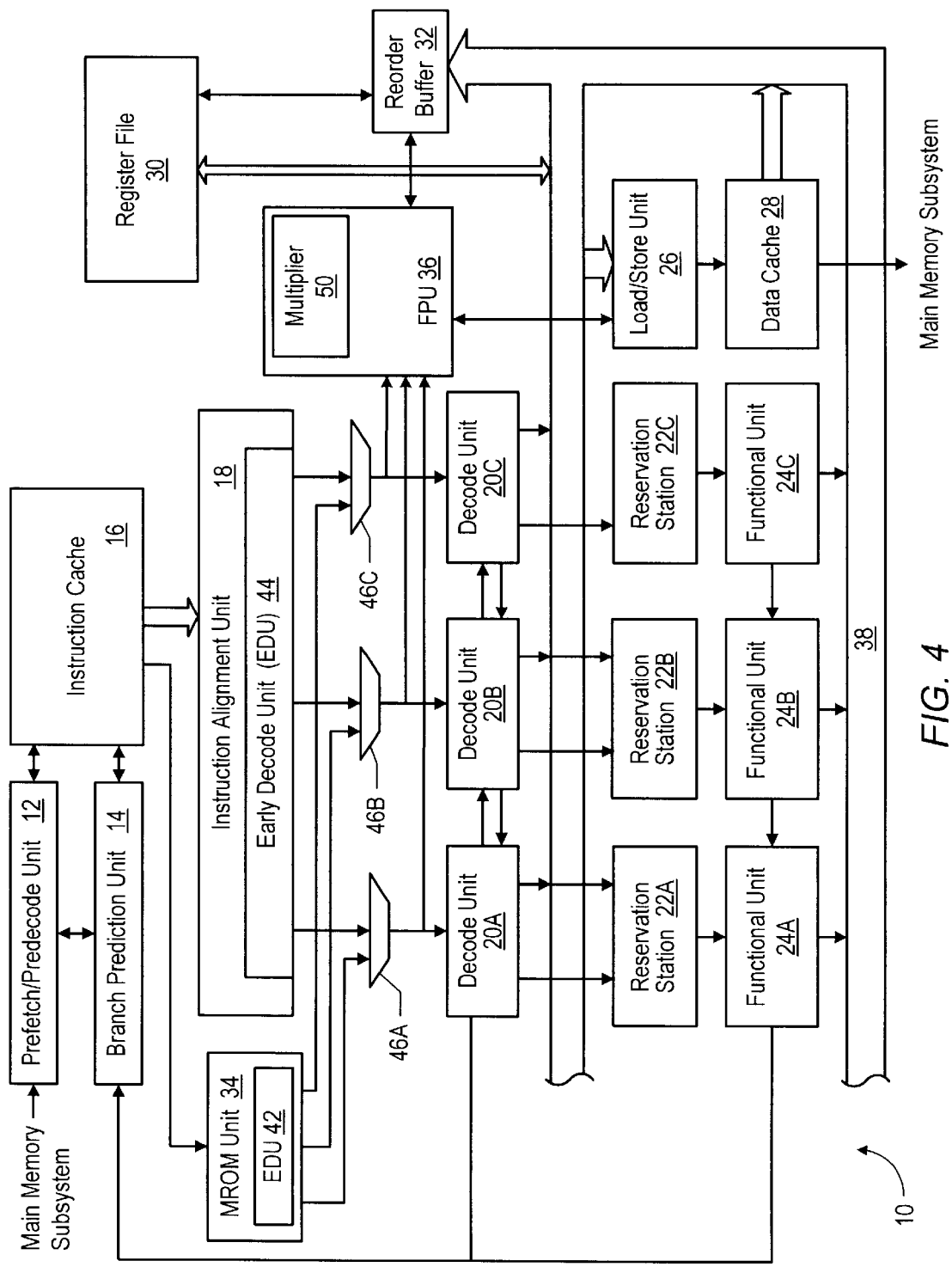
FIG. 4 is a diagram of one embodiment of a microprocessor with a floating point unit.

Example Microprocessor—FIG. 4

Turning now to FIG. 4, a block diagram of one embodiment of a microprocessor 10 is shown. As used herein the term "microprocessor" may refer to x86 compatible microprocessors, other microprocessors (e.g., RISC, VLIW), digital signal processors, micro-controllers, and other embedded and or integrated control and calculation devices. Additional embodiments are possible and contemplated.

This embodiment of microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point unit (FPU) 36, which in turn comprises multiplier 50. Before examining in detail one embodiment of FPU 36 that rapidly executes FLDCW-type instructions in an out-of-order context, the operation of microprocessor 10 will be briefly discussed. Note that elements referred to herein with a particular reference number followed by a letter may be collectively referred to by the reference number alone. For example, decode units 20A–20C may be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18, which comprises an early decode unit (EDU) 44, is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34, which also comprises an early decode unit (EDU) 42, is coupled to decode units 20 and FPU 36. Finally, FPU 36 is coupled to load/store unit 26 and reorder buffer 32.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2-way set associative structure having 64-byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 may predict the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented in a fully-associative, set-associative, or direct-mapped configuration.

Instructions are fetched from main memory and stored into instruction cache 16 by prefetch/predecode unit 12. Instructions may be prefetched prior to the request thereof in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction may be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will now be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate data byte would have start, end, and functional bits as follows:

| Start bits | 10000 |
|---|---|
| End bits | 00001 |
| Functional bits | 11000 |

According to one particular embodiment, early identification that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Microprocessor 10 may employ branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18 and MROM unit 34. As instructions are fetched from instruction cache 16, the corresponding predecode data is scanned to provide information to instruction alignment unit 18 and MROM unit 34 regarding the instructions being fetched. Instruction alignment unit 18 utilizes the scanning data to align an instruction to each of multiplexers 46A–C. In one embodiment, instruction alignment unit 18 aligns instructions from three sets of eight instruction bytes to decode units 20. Similarly, MROM unit 34 is configured to output up to three aligned instructions to multiplexers 46A–C. Note, both instruction alignment unit 18 and MROM unit 34 may each have an early decode unit (EDC) 42 and 44. These units may perform the first steps of the decoding process, e.g., identifying the operand specifiers for each instruction. These units may also begin the process of loading the desired operands from memory (if necessary). Early decode units 42–44 may also be configured to detect and route floating point instructions to the floating point unit 36.

Each multiplexer 46A–C is configured to receive a partially decoded instruction (and corresponding decode and predecode information) from instruction alignment unit 18 and MROM unit 34. Each multiplexer 46A–C is configured to select up to one instruction from either instruction alignment unit 18 or MROM unit 34 during each clock cycle. The selected instructions are routed to decode units 20A–C (integer instructions), and FPU 36 (floating point, MMX, and 3DX instructions). In one embodiment of microprocessor 10, up to three floating point/MMX/3DX instructions per clock cycle may be conveyed to floating point unit 36. As note above, the instructions may come from MROM unit 34 (microcode instructions) or instruction alignment unit 18 (fast path instructions).

Decode units 20 are configured to complete decoding instructions received from multiplexers 46A–C. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

Figure 3:
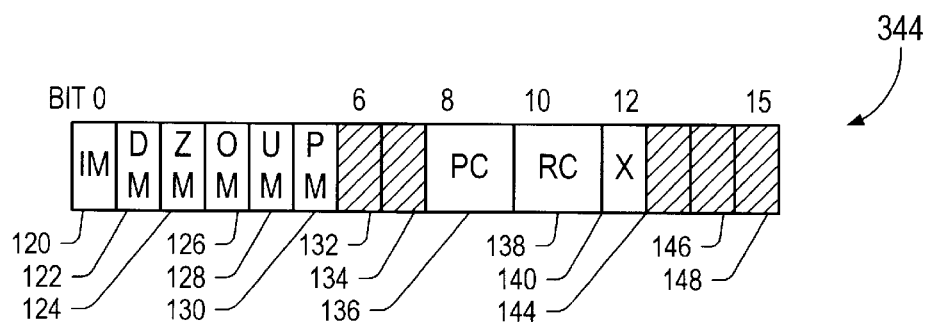
FIG. 3 shows a diagram of one embodiment of an x86-compatible floating point control word (FPCW).

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 3, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value, stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 5:
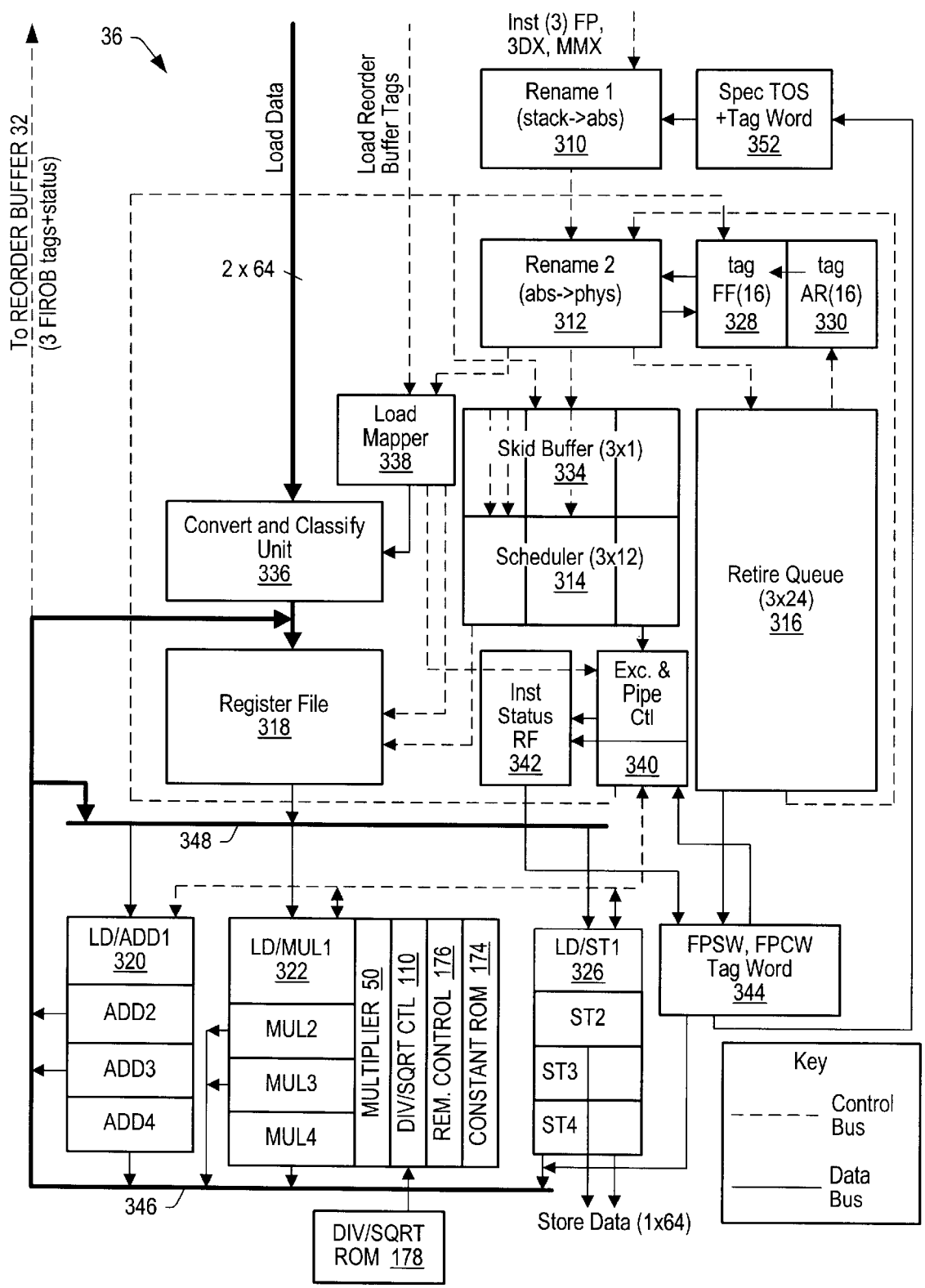
FIG. 5 is a block diagram of one embodiment of the floating point unit from the microprocessor of FIG. 4.

Example Floating Point Unit—FIG. 5

Turning now to FIG. 5, details of one embodiment of FPU 36 are shown. Other embodiments are possible and contemplated. FPU 36 is a high performance out-of-order execution unit capable of accepting up to three new instructions per clock cycle. The three instructions may be any combination of x86 floating point instructions, MMX instructions, or 3DX instructions. MMX and 3DX instructions are extensions to the standard x86 instruction set. One example of a 3DX instruction set extension is the 3DNow!™ extension from Advanced Micro Devices, Inc. MMX instructions are geared toward multimedia and two-dimensional graphic applications, while 3DX instructions are optimized for performing three-dimensional graphic manipulations such as rendering and texture mapping. Many 3DX instructions are vectored instructions that perform the same operation on a number of independent pairs of operands.

As the figure illustrates, this embodiment of FPU 36 comprises the following components: a rename-1 unit 310, a rename-2 unit 312, a scheduler 314, a retire queue 316, a register file 318, a load/add instruction pipeline 320, a load/multiply instruction pipeline 322, a load/store instruction pipeline 326, a skid buffer 334, a convert and classify unit 336 and a load mapper 338. Rename-1 unit 310 is coupled to rename-2 unit 312 and is configured to receive a speculative top of stack (TOS) tag and tag word 352. Rename-2 unit 312 is coupled to future file tag array 328, architectural tag array 330, retire queue 316, skid buffer 334, scheduler 314, and load mapper 338. Convert and classify unit 336 is also coupled to load mapper 338, which in turn is coupled to execution and pipe control unit 340 along with instruction status register file 342 and scheduler 314. Register file 318 receives inputs from convert and classify unit 336, load mapper 338 and scheduler 314, and outputs data to source operand bus 348. Source operand bus 348 is in turn coupled to instruction pipes 320, 322, and 326. Finally, instruction pipes 320, 322, and 326, and floating point status/control/tag words 344 are all coupled to result bus 346. While floating point status/control/tag words 344 and speculative top of stack and tag word 352 are shown separately in the figure for explanatory purposes, these tags may be stored together with future file tags 328 and architectural register tags 330 in a single storage location, e.g., within register file 318, execution and pipe control unit 340, or retire queue 316.

Rename-1 unit 310 receives up to three instructions per clock cycle. As previously noted, these may be any combination of floating point, MMX, or 3DX instructions. Rename-1 unit 310 converts stack-relative register operands into absolute register operands. The x86 instruction set and architecture defines eight floating point registers that are accessed in a stack-like manner (i.e., relative to a top-of-stack pointer). For instructions with memory operands, e.g., FLD instructions (floating point load) a designated destination register can be assigned. Rename-1 unit 310 also assigns each instruction to one of three instruction pipelines, either load/store pipeline 326, add pipeline 320, or multiply pipeline 322.

Rename-2 unit 312 performs true register renaming. Upon receiving the instructions from rename-1 unit 310, rename-2 unit 312 reads three register tags from a "free list" of the available registers stored within retire queue 316. Once the registers have been read, rename-2 unit 312 assigns one to the destination register of each instruction. To rename the source registers, rename-2 unit 312 indexes tag future file 328 using the absolute register number for each source register. Tag future file 328 stores tags that identify which registers store the current speculative future state of each of the sixteen architectural registers in FPU 36. Similarly, architectural register tag file 330 stores tags which identify which registers within register file 318 store the current architectural (non-speculative) state of FPU 36. Note, of the sixteen registers that define FPU 36's state (architectural or speculative), eight are architectural registers (i.e., floating point stack or MMX registers) and eight are micro-architectural registers (i.e., registers that store internal state information that is not generally accessible to the programmer). The old destination register tags are then read from the tag future file 328 and written to the tail of the free list. Finally, tag future file 328 is updated by storing tags for the new destination registers.

Memory operands may be handled by assigning them the same register tag as the destination register. This is because load data will be converted and directly written into the destination register when it is received from load/store pipeline 326. In the case of an FLD instruction (i.e., a floating point load instruction), no further execution is required, although the FLD instruction is still assigned to an execution pipeline for the purpose of handling exceptions and signaling completion to reorder buffer 32.

Once the three instructions have passed through rename-1 unit 310 and rename-2 unit 312, the instructions are represented in a three operand format (i.e., first source operand, second source operand, and destination operand). While the first source operand is always a register operand, a bit in the opcode may be used to indicate whether the second operand is a register operand or a memory operand.

From rename-2 unit 312 the instructions are passed to scheduler 314, where the three instructions are allocated a "line" of storage. If scheduler 314 is full, the instructions may be stored in skid buffer 334 until such time as there is room within scheduler 314. After receiving the three instructions, scheduler 314 snoops result bus 346 and source operand bus 348. Concurrently with allocating the line of storage and snooping, retire queue 316 allocates one entry for each instruction. The entries store the destination register tags, the absolute destination register number, and the old destination register number. Additional information may also be included, e.g., information that may be needed to update the architectural state at retire time.

On the cycle following their entry into scheduler 314, the instructions are available for scheduling. Scheduler 314 (also referred to herein as schedule unit 314) examines all of the stored instructions and issues the oldest instructions which meet the following criteria: (1) the instruction pipe to which the instruction has been assigned is available, (2) the result bus for that instruction pipe will be available on the clock cycle in which the instruction will complete (this is dependent upon the latency of the particular instruction), and (3) the instruction's source registers and or memory operands are available. In this embodiment, scheduler 314 may schedule up to three instructions per clock cycle. As used herein, scheduling refers to conveying instructions from the scheduler to their corresponding execution pipelines. Each of the three instruction pipes 320, 322, and 326 may accept a new instruction every clock cycle. Other embodiments capable of scheduling four or more instructions are also possible and contemplated.

Once all three entries in a line are scheduled, that line is free to be compacted out of scheduler 314. When the instructions are conveyed from scheduler 314 to their respective instruction execution pipeline, their source operands are read. In some cases, the source data will come from a register, while in other cases the source data will come from a "bypass". A bypass refers to the practice of result forwarding. Result forwarding involves conveying the results from a recently executed instruction directly to other instructions that depend upon that result. Using result forwarding allows the result to be used in subsequent instructions without having to wait for the result to be stored in a register and then read from the same register.

Each instruction execution pipe 320, 322, and 326 may be configured as a four-stage pipeline. In the first stage of each pipeline, the result buses are read and the input data is taken from either the source operand bus (if the data is within register file 318) or the result bus (if a bypass is being performed). Once the source data has been received, each instruction pipe may begin performing the appropriate computation.

In the embodiment shown in the figure, instruction pipe 320 is configured to perform load and addition operations, instruction pipe 322 is configured to perform load and multiplication operations, and instruction pipe 326 is configured to perform load and store operations. Both instruction pipes 320 and 322 may be configured to perform certain MMX instructions. Instruction pipe 322, which comprises multiplier 50, may also be configured to perform iterative calculations that involve multiplication, e.g., reciprocal operations, division operations, and square root operations, under the control of control unit 110, division/square root ROM 178, and, if a remainder is called for, remainder control unit 176. Constant ROM 174 is a read only memory configured to store a plurality of constants for instructions such as FLDPI (load constant), for transcendental computations, for self-checking, and for certain special and exceptional results. Division/square root ROM 178 is a read only memory which stores constants used to determine initial values for division and square root computations and constants returned by certain 3DNow! instructions. Control unit 110 provides sequence information for division and square root functions. Note, in some embodiments control unit 110 may be part of execution and pipe control unit 340.

In some cases, instruction operands or the results generated by executing an instruction may be too small to fit within the operand or result's standard data format. These numbers are referred to as "denormals". While normalized floating point values have a non-zero exponent and a one in the most significant bit of the significand, i.e., the bit directly to the left of the binary radix point (e.g., 1.001010 . . . ), denormals are represented with a zero exponent and a zero in the most significant bit of the significand (e.g., 0.000101 . . . ). Denormal load data is detected and tagged by convert and classify unit 336. Denormal results generated by during execution within instruction pipes 320, 322, and 326 are tagged when they are generated. Execution and pipe control unit 340 detects the presence of the denormal tags and calls an appropriate microcode routine from MROM 34 to handle the denormal data.

At the end of the final execution stage, the data is placed on result bus 346. This makes the result data available for an instruction entering the first stage of one of the instruction execution pipelines during the next clock cycle. Once the data is on the result bus, it may also be written into register file 318. Instead of being stored in register file 318, store data is sent to the load/store unit 26. The reorder buffer tag and any exception information is sent back to reorder buffer 32. At this point, the instructions are complete. However, they are still speculative. When the instructions reach the bottom of reorder buffer 32 (assuming there is no branch misprediction or exception abort), reorder buffer 32 notifies FPU 36 that the instructions should be retired. The speculative state of the floating point unit 36 is committed to the architectural state when retire queue 316 updates the tags for the architectural register file 328, and the destination register tags in retire queue 316 are written to the architectural register file 318.

Convert and classify unit 336 receives all load data, classifies it by data type, and converts it to an internal format if necessary. In one embodiment, convert and classify unit 336 appends a three bit classification tag to each data item. The three bit tag classifies the accompanying data as one of the following eight potential data types: (1) zero, (2) infinity, (3) quiet NaN, (4) signaling NaN, (5) denormal, (6) MMX, (7) normal, or (8) unsupported. NaN is a standard abbreviation for "Not-a-Number". While representations may vary across different implementations, zero data types are typically represented with a zero exponent and a zero significand. Similarly, infinity data types are typically represented with an exponent comprising all asserted ones. A quiet NaN ("QNaN") is generated whenever a floating point instruction causes an invalid operation, e.g., a square root operation on a negative number. A signaling NaN ("SNaN"), unlike a quiet NaN, generates an exception when used. Signaling NaNs are not generated by FPU 36 and are typically only used by programmers to signal particular error conditions. The table below illustrates the typical characteristics of each data type for x86 compatible floating point units (wherein "x" represents either a one or a zero):

| Sign | Exponent | Significand | Value |
|---|---|---|---|
| x | $00...00_2$ | $0.00...00_2$ | Zero |
| x | $11...11_2$ | $1.00...00_2$ | Infinity |
| x | $11...11_2$ | $1.1xx...xx_2$ | QNaN |

-continued

| Sign | Exponent | Significand | Value |
|---|---|---|---|
| x | $11...11_2$ | $1.0xx...xx_2$ | SNaN |
| x | $00...00_2$ | $0.xx...xx_2$ | Denormal |

MMX data types are 64 bits wide and comprise either eight packed 8-bit bytes, four packed 16-bit words, or two packed 32-bit double-words. MMX data types may be detected by the MMX opcodes which precede them. Normal data types are standard floating point values that are either single precision, double precision, or extended precision (before they are translated into an internal data format) and that do not have the characteristics of any of the previously described data types. Unsupported data types are extended precision bit patterns that do not fall into any of the previously described data types and that fall outside of the normal data type as defined by IEEE Standard 754. For example, an extended precision bit sequence having a 0 sign bit, a biased exponent of 11 . . . 11, and a significand in the format (f.ff . . . ff) of 0.11 . . . 11 is an unsupported value. Note, however, in other embodiments larger or smaller classification tags and additional or fewer data types may be implemented.

The data types and exemplary formats illustrated above describe the data as it is received and identified by convert and classify unit 336. Once convert and classify unit 336 classifies the data, the classification tag may be used to identify some or all of the data's properties. For example, if a value is classified as a zero, it may be identified solely by its classification tag instead of having to perform a wide comparison of each bit in the exponent and significand portions of the value. The classification tags may accompany the data throughout FPU 36 and may be stored in register file 18 along with the data.

As discussed above, when data from a load instruction is received by FPU 36, the data is routed to convert and classify unit 336. A corresponding reorder buffer tag accompanies the data and is routed in parallel to load mapper 338. As previously noted in the description of microprocessor 10, the reorder buffer tag identifies the sequence in which out of order instructions should be retired (i.e., committed to architectural state). For load instructions, the reorder buffer tag follows the data from load/store unit 26 to FPU 36. Load mapper 338 receives the reorder buffer tag and translates it into a data register tag. The data register tag indicates which data register within register file 318 the corresponding data is to be loaded into.

Execution and pipe control unit 340 tracks the status of each stage in instruction pipes 320, 322, and 326. Execution and pipe control unit 340 contains timing information enabling it to determine the future availability of each instruction pipe. For example, when an FMUL (floating point multiply) instruction begins execution in multiplication instruction pipe 322, control unit 340 uses its stored timing information to notify scheduler 314 that the result will be available for output on result bus 346 four clock cycles later. This timing information allows scheduler 314 to efficiently schedule instruction for execution in instruction pipes 320, 322, and 326. Control unit 320 also tracks the status of each pipe stage, receiving and prioritizing exceptions from instruction pipes 320, 322, and 326.

FPU status word, control word, and tag word (collectively, words 344) are stored within retire queue 316 and indicate which of the status and control registers within register file 318 contain the FPU's current architectural state. For example, in one embodiment register file 318 may comprise 88 registers, i.e., 16 registers to store the current architectural state of FPU 36 (see below), and 72 speculative registers to store the speculative state of FPU 36. Of the 72 speculative registers, 16 of them store the "current" speculative state. Of each set of 16 registers that store a particular state of FPU 36 (whether the state is architectural or speculative), eight registers are FPU stack registers and eight registers are micro-architectural registers that store state information that is only accessible to microcode instructions within FPU 36, i.e., they are not accessible to the programmer and store only internal state information. In one embodiment, each register in register file 314 is 90 bits long, with 87 bits providing storage for internal format data (e.g., one sign bit, 18 exponent bits, and a 68-bit significand) and 3 class bits.

Instruction status register file 342 stores information for execution and pipe control unit 320. As a result of instructions executing out of order in FPU 36, exceptions that occur within instruction pipes may need to be stored until the instructions generating them are the next to be retired. Retire queue 316 reads instruction status register file 342 when it retires instructions and updates the architectural floating point status word (FPSW) and floating point control word (FPCW) and tag word (collectively, 344) accordingly. This information is conveyed to rename-1 unit along with the current speculative top of stack 352 and on result bus 346.

Figure 6:
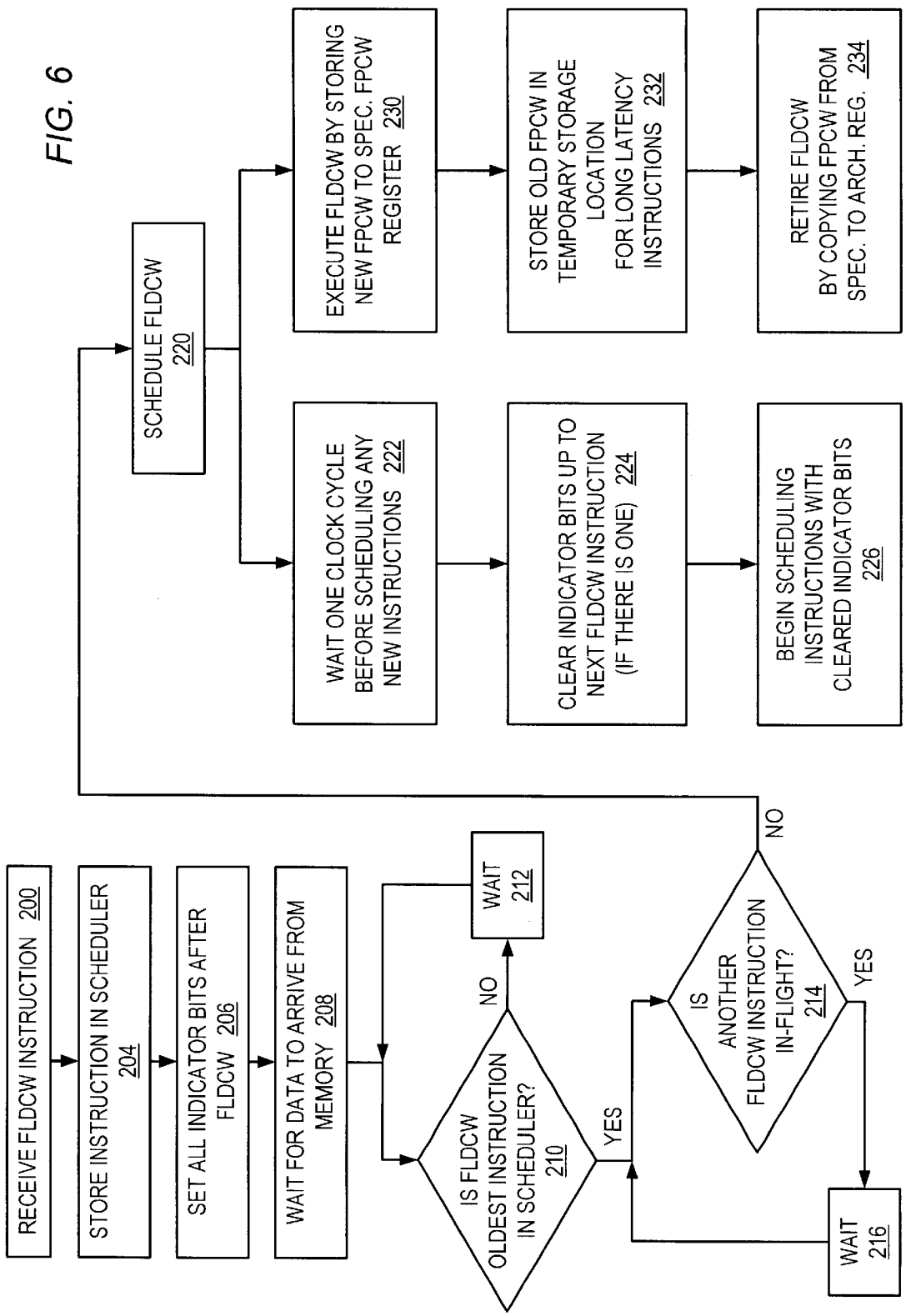
FIG. 6 is a flowchart of one embodiment of a method for rapidly executing FLDCW instructions.

Method for Executing FLDCW-type Instructions—FIG. 6

FIG. 6 is a flowchart illustrating one embodiment of a method for rapid execution of FLDCW-type instructions. First, an FLDCW-type instruction is received by floating point unit 36 (step 200). After passing through register rename units 310–312, the FLDCW-type instruction is stored in scheduler 314. The FLDCW-type instruction causes the scheduler to set indicator bits for all instructions occurring after the FLDCW-type instruction in program order. Since the floating point unit receives instructions in program order, the scheduler may assert an indicator bit for each instruction received after the FLDCW-type instruction.

Next, the scheduler waits (step 208) until the data corresponding to the FLDCW-type instruction is received by the floating point unit. Once the data is received, the scheduler examines the stored instructions during each clock cycle to determine whether the FLDCW-type instruction is the oldest remaining instruction in the scheduler (step 210). This may be determined by looking for any instructions remaining in the scheduler that do not have an asserted indicator bit. If there is another instruction with a cleared indicator bit that has not yet been scheduled, then the scheduler waits (step 212) until that instruction has been scheduled. In other embodiments the indicator bit may also be set for the FLDCW-type instruction.

Once there are no other instructions with cleared indicator bits waiting to be scheduled, the scheduler may check whether there are any "in-flight" FLDCW-type instructions that have already been scheduled but have not completed execution (step 214). If there are such in-flight instructions, then the scheduler may wait until they have been retired (step 216).

Once the scheduler has determined that (i) the FLDCW-type instruction is the oldest instruction ready to be scheduled, and (ii) that there are no additional FLDCW-type instructions currently executing, then the scheduler may schedule the FLDCW-type instruction for execution (step 220). Next, the scheduler may optionally wait a predetermined number of clock cycles (e.g., one clock cycle) before scheduling any additional instructions (step 222). This "pause" allows the FLDCW-type instruction to begin propagating through one of execution units 320–326 and ensures that the instructions scheduled after the FLDCW-type instruction have access to the new floating point control word (FPCW) as modified by the FLDCW-type instruction.

While the scheduler is waiting, it may be configured to clear all of the indicator bits (step 224). If a second FLDCW-type instruction has already been stored in the scheduler, the scheduler may refrain from clearing any indicator bits corresponding to the second FLDCW-type instruction or any instructions occurring after the second FLDCW-type. This ensures the process may handle more than one FLDCW-type instruction stored concurrently in the scheduler. Once the desired number of clock cycles have elapsed and the indicator bits have been cleared, the scheduler may once again begin scheduling instructions with cleared indicator bits (step 226).

In parallel, the FLDCW-type instruction may be executed by one of execution pipelines 320–326 by storing the new FPCW to a speculative FPCW register (step 230). As previously noted, FPU 36 may have two sets of each defined x86 floating point register. The first set are known as architectural registers. They store the most recent non-speculative states for each register defined in the x86 architecture. The second set is speculative and contains speculative state information corresponding to instructions that were speculatively executed (e.g., based on branch predictions) but that have not yet retired. When the corresponding instruction is retired, the speculative register becomes the architectural register. This may be accomplished through register renaming (e.g., with pointers) or by copying the contents of the speculative register into the architectural register. The old architectural register is then freed for subsequent by a new instruction as use as a speculative register.

In addition to executing the FLDCW-type instruction, some embodiments of the floating point unit may be configured to store a copy of the old FPCW before it is updated by the FLDCW-type instruction (step 232). This may be useful for long-latency instructions (e.g., square root instructions) that are run through their respective functional pipeline multiple times before they complete execution. When the FLDCW-type instruction has completed executing, it is retired by copying the FPCW from the speculative register to the architectural register (step 234).

Please note that the flowchart illustrated in the figure is for explanatory purposes and is not meant to be limiting. Depending upon the exact implementation, the steps may be performed in series or in a different order. The steps may also be performed using a different number of clock cycles than implied by the figure. For example, the floating point unit may be configured to receive multiple instructions per clock cycle. In some embodiments, steps 200, 204, and 206 may be combined and may be performed in a single clock cycle. Additional steps may also be added. In some embodiments, the method described above may be implemented in hardware. In other embodiments, the method may be implemented in software (e.g., in microcode) or a combination of software and hardware.

Figure 7A:
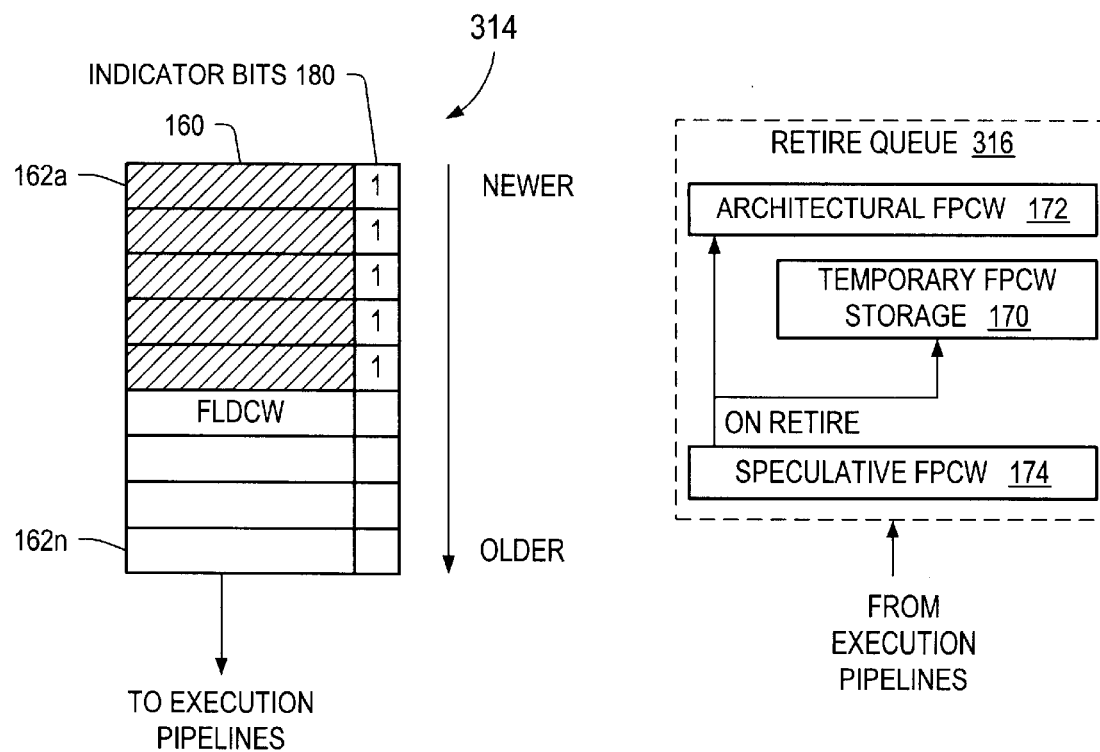
FIGS. 7A–B are diagrams of one embodiment of the schedule unit from FIG. 5.
Figure 7B:
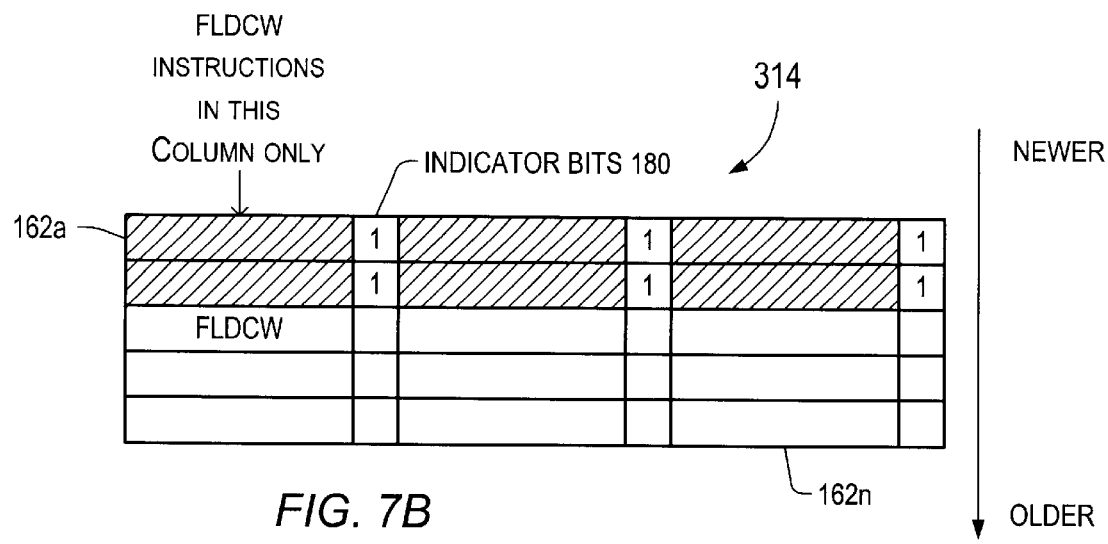

Details of Scheduler—FIGS. 7A–B

FIG. 7A shows details of one embodiment of floating point unit 36 configured to rapidly execute FLDCW-type instructions. In this embodiment, scheduler 314 comprises a number of storage locations 162a-n configured to store instructions that are awaiting execution. Scheduler 314 also comprises a number of corresponding storage locations configured to store indicator bits 180. For example, one indicator bit may correspond to each instruction stored in schedule 314.

In this embodiment of scheduler 314, instructions may be scheduled out of order, but the instructions remaining within scheduler 314 remain in order from newest to oldest as shown in the figure. When one or more instructions are scheduled, the remaining instructions may be shifted downward to make room for new instructions at the top of scheduler 314. In this way, instructions may be scheduled in an out-of-order fashion, but the instructions remaining in the scheduler may still be ordered relative to each other (i.e., the instruction at the bottom of the scheduler will always be the oldest remaining instruction).

When an FLDCW-type instruction is received by scheduler 314, it is stored into the next available storage location (i.e., starting with storage location 162a). As instructions are scheduled and output from scheduler 314, the FLDCW-type instruction will be shifted down toward the bottom of scheduler 314. Indicator bits 180 are asserted for each instruction loaded into the scheduler after the FLDCW-type instruction.

As previously noted, while scheduler 314 may schedule instructions for execution out of program order, FLDCW-type instructions are not scheduled until they are the oldest instruction remaining in the scheduler. Similarly, scheduler 314 is configured not to schedule any instruction having an asserted indicator bit 180. Once the FLDCW-type instruction is the oldest remaining instruction in the scheduler, the scheduler may then schedule the FLDCW-type instruction for execution. The current speculative FPCW 174 may be copied to temporary storage location 170 to be available for long latency ops. When the FLDCW-type instruction is retired, the corresponding speculative FPCW 174 is copied to architectural FPCW 172. This copy of the new FPCW may be used by long latency operations (e.g., square root). In one embodiment, temporary storage location 170 may be part of register file 318 or part of multiplier pipe 322.

After the FLDCW-type instruction is scheduled, in some embodiments the scheduler may be configured to "pause" for one or more clock cycles before scheduling any additional instructions. This pause may allow the FLDCW-type instruction to propagate through its corresponding execution pipeline and may prevent instructions following the FLDCW-type instruction from executing using the old FPCW. The length of the pause, if any, may be determined by the cycle time of the FLDCW-type instruction. During this pause, scheduler 314 may be configured to clear indicator bits 180. If a second FLDCW-type instruction is stored in scheduler 314, then indicator bits 180 are only cleared up to the second FLDCW-type instruction. The scheduler may be configured to refrain from scheduling the second FLDCW-type instruction until the first FLDCW-type instruction becomes non-speculative (i.e., until the first FLDCW-type instruction is retired). This prevents more than one speculative FPCW from having to be stored in the floating point unit. In some embodiments, decode units 20 may also be configured to stall if more than one FLDCW-type instructions is stored in scheduler 314 and additional FLDCW-type instructions are detected.

Thus, FLDCW-type instructions may act as a barrier by not allowing any younger instructions to schedule before the FLDCW-type instruction itself is scheduled. When the FLDCW-type instruction finally executes, the new FPCW is stored in to speculative FPCW status register 174. When the FLDCW-type instruction is retired, the speculative contents are copied from speculative floating point control word register 174 to architectural floating point control word register 172.

In some embodiments of microprocessor 10 and floating point unit 36, certain faults (e.g., stack faults) are detected at the very early stages of the instruction processing pipeline (e.g., in rename1 unit 310). To deal with this, microcode may be used to check if an executed FLDCW-type instruction changes any of the exception masking bits in the FPCW. The microcode may make this determination by comparing the speculative FPCW with the architectural FPCW. If the FLDCW-type instruction does change the mask bits, a microcode trap may be taken. The trap clears all speculatively executed instructions after the FPCW (because they may have been executed using incorrect exception masking bits). As previously noted, however, changes in the rounding mode are typically more common than changes in mask bits.

While the scheduler is shown as a one dimensional array for simplicity other configurations are possible (e.g., a two-dimensional array 3×12). Details regarding the operation of different embodiments of scheduler 314 are described in greater detail in the following U.S. patent application, which is incorporated herein by reference in its entirety: "Method and Apparatus for Instruction Queue Compression" by Jeffrey E. Trull, filed on Feb. 19, 1999, Ser. No. 09/253,466, now U.S. Pat. No. 6,185,672.

FIG. 7B illustrates another embodiment of scheduler 314. In this embodiment, scheduler 314 is implemented as an array of storage locations. FLDCW-type instructions may only be stored in the first column. This advantageously reduces the amount of hardware necessary to support the method described above. Other configurations of scheduler 314 are also possible and contemplated.

Figure 8:
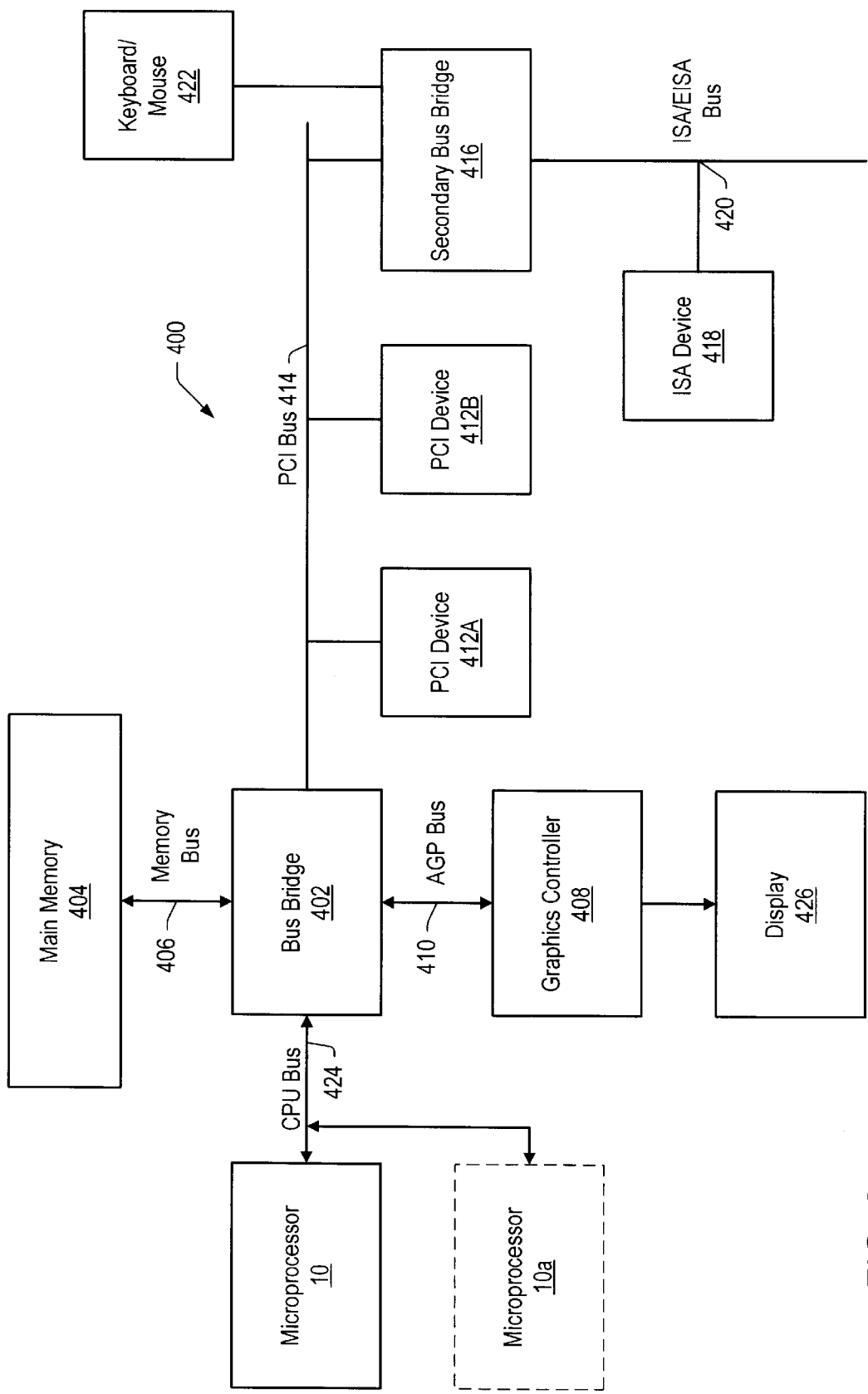
FIG. 8 is a block diagram of one embodiment of a computer system configured to utilize the microprocessor of FIG. 4.

Example Computer System—FIG. 8

FIG. 8 shows a block diagram of one embodiment of a computer system 400 including microprocessor 10. Microprocessor 10 is coupled to a variety of system components through a bus bridge 402. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated into bus bridge 402.

Main memory 404 is a memory in which application programs are stored and from which microprocessor 10 primarily executes. A suitable main memory 404 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a communications device (e.g., a modem or a network card), a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g. microprocessor 10a shown as an optional component of computer system 400). Microprocessor 10a may be similar to microprocessor 10. More particularly, microprocessor 10a may be an identical copy of microprocessor 10. Microprocessor 10a may share CPU bus 424 with microprocessor 10 or may be connected to bus bridge 402 via an independent bus.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

What is claimed is:

1. A method for executing floating point load control word (FLDCW) type instructions in a microprocessor comprising:

receiving a plurality of instructions, wherein at least one of said plurality of instructions is an FLDCW-type instruction;

selecting instructions older than a first FLDCW-type instruction for scheduling in an out-of-order fashion;

allowing the first FLDCW-type instruction to be scheduled only if the first FLDCW-type instruction is the oldest remaining instruction ready for execution; and scheduling instructions occurring after the first FLDCW-type instruction in an out-of-order fashion only after the first FLDCW-type instruction has been scheduled.

2. The method as recited in claim 1, further comprising associating asserted indicator bits with each instruction following the first FLDCW-type instruction, wherein said selecting comprises selecting only instructions without asserted indicator bits.

3. The method as recited in claim 2, further comprising clearing all asserted indicator bits corresponding to instructions occurring after the first FLDCW-type instruction.

4. The method as recited in claim 2, further comprising clearing all asserted indicator bits corresponding to instructions occurring after the first FLDCW-type instruction and before a second FLDCW-type instruction.

5. The method as recited in claim 2, further comprising waiting one or more clock cycles before scheduling instructions after the first FLDCW-type instruction has been scheduled.

6. The method as recited in claim 2, further comprising storing a temporary copy of the microprocessor's floating point control word for use by long latency operations.

7. The method as recited in claim 2, further comprising stalling instruction decoding if more than one concurrent in-flight FLDCW-type instruction is detected by the microprocessor.

8. The method as recited in claim 2, further comprising stalling instruction decoding if more than two concurrent in-flight FLDCW-type instructions are detected by the microprocessor.

9. The method as recited in claim 2, further comprising trapping to microcode if any FLDCW-type instructions change the microprocessor's floating point control word exception mask bits.

10. The method as recited in claim 9, wherein the microcode is configured to discard all instructions speculatively executed before the first FLDCW-type instruction executed if the first FLDCW-type instruction changes the microprocessor's floating point control word exception mask bits.

11. The method as recited in claim 9, further comprising comparing the new floating point control word to be written by the first FLDCW-type instruction to the microprocessor's current floating point control word to determine if the first FLDCW-type instruction change the microprocessor's floating point control word exception mask bits.

12. The method as recited in claim 9, wherein stack faults are detected before instructions are scheduled.

13. A microprocessor configured to execute floating point load control word (FLDCW) type instructions, wherein the microprocessor comprises:

an instruction cache configured to receive and store a plurality of instructions, wherein a subset of said plurality of instructions are floating point instructions, and wherein at least one of said floating point instructions is an FLDCW-type instruction; and a floating point unit configured to receive floating point instructions from said instruction cache, wherein the floating point unit comprises a scheduler configured to receive, store, and schedule floating point instructions for execution, wherein the scheduler is configured to select instructions older than a first FLDCW-type instruction for scheduling in an out-of-order fashion, wherein the scheduler is configured to allow the first FLDCW-type instruction to be scheduled only if the first FLDCW-type instruction is the oldest remaining instruction in the scheduler that is ready for execution; and wherein the scheduler is configured to schedule instructions occurring after the first FLDCW-type instruction in an out-of-order fashion only after the first FLDCW-type instruction has been scheduled.

14. The microprocessor as recited in claim 13, wherein the scheduler is further configured to associate asserted indicator bits with each instruction following the first FLDCW-type instruction, and wherein the scheduler is configured to ignore instructions having asserted indicator bits when scheduling instructions before the first FLDCW-type instruction is scheduled.

15. The microprocessor as recited in claim 13, wherein the scheduler, once the first FLDCW-type instruction has been scheduled, is further configured to clear all asserted indicator bits that correspond to floating point instructions occurring after the first FLDCW-type instruction and before a second FLDCW-type instruction.

16. The microprocessor as recited in claim 13, wherein the scheduler is configured to wait one or more clock cycles before scheduling instructions after the first FLDCW-type instruction has been scheduled.

17. The microprocessor as recited in claim 13, wherein the floating point unit is configured with a floating point control word (FPCW), wherein the floating point unit further comprises a storage location configured to store a temporary copy of the FPCW, wherein said storage location is configured to be read by long-latency instructions.

18. The microprocessor as recited in claim 13, further comprising one or more decode units coupled between the instruction cache and said floating point unit, wherein the decode units are configured to stall instruction decoding if more than one in-flight FLDCW-type instruction is detected.

19. The microprocessor as recited in claim 13, wherein the floating point is configured with a floating point control word, wherein said floating point control word comprises one or more exception mask bits, wherein the floating point unit further comprises comparison logic configured to determine whether the each FLDCW-type instruction changes said exception mask bits.

20. A computer system comprising:

a communications device;

a system bus;

a microprocessor coupled to said communications device, wherein the microprocessor comprises:

an instruction cache configured to receive and store a plurality of instructions, wherein a subset of said plurality of instructions are floating point instructions, and wherein at least one of said floating point instructions is an FLDCW-type instruction; and a floating point unit configured to receive floating point instructions from said instruction cache, wherein the floating point unit comprises a scheduler configured to receive, store, and schedule floating point instructions for execution, wherein the scheduler is configured to select instructions older than a first FLDCW-type instruction for scheduling in an out-of-order fashion, wherein the scheduler is configured to allow the first FLDCW-type instruction to be scheduled only if the first FLDCW-type instruction is the oldest remaining instruction in the scheduler that is ready for execution; and wherein the scheduler is configured to schedule instructions occurring after the first FLDCW-type instruction in an out-of-order fashion only after the first FLDCW-type instruction has been scheduled.

* * * * *